United States Patent
Mills

(10) Patent No.: US 12,405,752 B2
(45) Date of Patent: Sep. 2, 2025

(54) MIGRATING DATA BETWEEN BYTE-ADDRESSABLE AND BLOCK-ADDRESSABLE STORAGE DEVICES IN PROCESSOR-BASED DEVICES

(71) Applicant: SMART Modular Technologies, Inc., Newark, CA (US)

(72) Inventor: Andrew Mills, Coto de Caza, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 0 days.

(21) Appl. No.: 18/373,234

(22) Filed: Sep. 26, 2023

(65) Prior Publication Data

US 2025/0103247 A1    Mar. 27, 2025

(51) Int. Cl.
G06F 3/06    (2006.01)

(52) U.S. Cl.
CPC .......... *G06F 3/0664* (2013.01); *G06F 3/0619* (2013.01); *G06F 3/0653* (2013.01); *G06F 3/0659* (2013.01); *G06F 3/0673* (2013.01)

(58) Field of Classification Search
CPC .... G06F 3/0619; G06F 3/0653; G06F 3/0664; G06F 3/0659; G06F 3/0673
See application file for complete search history.

(56) References Cited

U.S. PATENT DOCUMENTS

| 6,088,766 A | 7/2000 | Bachmat et al. |
| 6,286,092 B1 | 9/2001 | Frank et al. |

(Continued)

FOREIGN PATENT DOCUMENTS

| CN | 1280760 C | 10/2006 |
| EP | 2354919 A2 | 8/2011 |

(Continued)

OTHER PUBLICATIONS

Storagereview Enterprise Lab, "MemVerge Memory Machine Review," StorageReview.com, Jan. 14, 2021, available from the Internet: [URL: https://www.storagereview.com/review/memverge-memory-machine-review], 10 pages.

(Continued)

*Primary Examiner* — Jane W Benner
(74) *Attorney, Agent, or Firm* — Withrow & Terranova, P.L.L.C.

(57) ABSTRACT

Migrating data between byte-addressable and block-addressable storage devices in processor-based devices is disclosed. In this regard, a processor of a processor-based device is communicatively coupled to both a byte-addressable storage device and a block-addressable storage device. The processor is configured to present the byte-addressable storage device and the block-addressable storage device as a single virtual storage device (i.e., as either a byte-addressable virtual device or a block-addressable virtual storage device). The processor is further configured to identify a low-activity region in the byte-addressable storage device, and to also identify a high-activity region in the block-addressable storage device. The processor then exchanges a first storage region corresponding to the low-activity region (Continued)

and comprising a memory address region of the byte-addressable storage device with a second storage region corresponding to the high-activity region and comprising a block region of the block-addressable storage device.

18 Claims, 8 Drawing Sheets

(56) References Cited

U.S. PATENT DOCUMENTS

| | | | |
|---|---|---|---|
| 7,409,515 | B2 | 8/2008 | Hanai et al. |
| 8,046,537 | B2 | 10/2011 | Carr et al. |
| 8,082,385 | B2 | 12/2011 | Wong |
| 8,103,821 | B2 | 1/2012 | Chang et al. |
| 8,285,758 | B1 | 10/2012 | Bono et al. |
| 8,627,004 | B2 | 1/2014 | Montgomery |
| 8,627,035 | B2 | 1/2014 | Ambat et al. |
| 8,639,899 | B2 | 1/2014 | Kawakami et al. |
| 10,282,291 | B2 | 5/2019 | Mills et al. |
| 10,956,326 | B2 | 3/2021 | Mills et al. |
| 2005/0262323 | A1 | 11/2005 | Woo et al. |
| 2007/0088929 | A1 | 4/2007 | Hanai et al. |
| 2008/0016308 | A1 | 1/2008 | Bartley et al. |
| 2008/0168228 | A1 | 7/2008 | Carr et al. |
| 2009/0089485 | A1 | 4/2009 | Yeh |
| 2009/0276564 | A1 | 11/2009 | Wong |
| 2010/0115186 | A1 | 5/2010 | Chang et al. |
| 2011/0167217 | A1 | 7/2011 | Montgomery |
| 2011/0197046 | A1* | 8/2011 | Chiu .................... G06F 3/0617 711/171 |
| 2011/0271071 | A1 | 11/2011 | Nakatogawa |
| 2012/0278569 | A1 | 11/2012 | Kawakami et al. |
| 2013/0024650 | A1 | 1/2013 | Ambat et al. |
| 2013/0124780 | A1 | 5/2013 | Baderdinni et al. |
| 2018/0329643 | A1* | 11/2018 | Kurjanowicz ...... G06F 9/45558 |
| 2020/0097182 | A1* | 3/2020 | Volvovski ............ G06F 3/0649 |
| 2021/0328593 | A1* | 10/2021 | Kesavan .............. G06F 3/0653 |
| 2022/0057954 | A1* | 2/2022 | Cui ......................... G06F 3/061 |
| 2023/0043733 | A1* | 2/2023 | Luo ....................... G06F 3/0644 |
| 2024/0111429 | A1* | 4/2024 | Vankamamidi ...... G06F 3/0667 |

FOREIGN PATENT DOCUMENTS

| | | | |
|---|---|---|---|
| FR | 2833726 | A1 | 6/2003 |
| JP | H0756691 | A | 3/1995 |
| JP | H10187505 | A | 7/1998 |
| JP | 2001067187 | A | 3/2001 |
| JP | 2002207629 | A | 7/2002 |
| JP | 2010191539 | A | 9/2010 |
| WO | 2010085228 | A1 | 7/2010 |
| WO | 2012020471 | A1 | 2/2012 |

OTHER PUBLICATIONS

Non-Final Office Action for U.S. Appl. No. 13/866,201, mailed Feb. 12, 2015, 17 pages.
Final Office Action for U.S. Appl. No. 13/866,201, mailed Jul. 17, 2015, 20 pages.
Advisory Action for U.S. Appl. No. 13/866,201, mailed Jan. 14, 2016, 3 pages.
Non-Final Office Action for U.S. Appl. No. 13/866,201, mailed Sep. 16, 2016, 25 pages.
Non-Final Office Action for U.S. Appl. No. 13/866,201, mailed Feb. 3, 2017, 26 pages.
Final Office Action for U.S. Appl. No. 13/866,201, mailed Jul. 27, 2017, 27 pages.
Advisory Action and Examiner-Initiated Interview Summary for U.S. Appl. No. 13/866,201, mailed Oct. 23, 2017, 4 pages.
Non-Final Office Action for U.S. Appl. No. 13/866,201, mailed Mar. 1, 2018, 35 pages.
Final Office Action for U.S. Appl. No. 13/866,201, mailed Jul. 27, 2018, 34 pages.
Advisory Action, Examiner-Initiated Interview Summary, and AFCP 2.0 Decision for U.S. Appl. No. 13/866,201, mailed Oct. 12, 2018, 5 pages.
Notice of Allowance and Examiner-Initiated Interview Summary for U.S. Appl. No. 13/866,201, mailed Jan. 2, 2019, 17 pages.
Non-Final Office Action for U.S. Appl. No. 16/359,230, mailed Jul. 28, 2020, 19 pages.
Applicant-Initiated Interview Summary for U.S. Appl. No. 16/359,230, mailed Oct. 28, 2020, 3 pages.
Notice of Allowance for U.S. Appl. No. 16/359,230, mailed Nov. 27, 2020, 9 pages.
First Office Action for Chinese Patent Application No. 201380020988.1, mailed Aug. 1, 2016, 15 pages.
Second Office Action for Chinese Patent Application No. 201380020988.1, mailed Mar. 30, 2017, 17 pages.
Extended European Search Report for European Patent Application No. 13778525.9, mailed Oct. 30, 2015, 3 pages.
Search Report for Japanese Patent Application No. 2015507238, mailed Sep. 28, 2015, 29 pages.
Notice of Reasons for Refusal for Japanese Patent Application No. 2015507238, mailed Oct. 6, 2015.
International Search Report and Written Opinion for International Patent Application No. PCT/US2013/037487, mailed Jul. 30, 2013.

* cited by examiner

MIGRATING DATA BETWEEN BYTE-ADDRESSABLE AND BLOCK-ADDRESSABLE STORAGE DEVICES IN PROCESSOR-BASED DEVICES

FIELD OF THE DISCLOSURE

The technology of the disclosure relates generally to a storage system, and more particularly to a storage system having multiple tiers of storage media having different performance capabilities and different addressing mechanisms.

BACKGROUND

Modern processor-based devices employ a variety of information storage systems to store, protect, and/or communicate data, and to provide user access to the data. Such information storage systems range from volatile memory devices (e.g., double data rate (DDR) random access memory (RAM) devices, synchronous dynamic RAM (SDRAM) memory devices, and the like, as non-limiting examples) to persistent storage devices (such as solid state drive (SSD) devices, NOT-AND (NAND) flash devices, and the like, as non-limiting examples). Memory devices provide faster access to stored data, but require power to maintain the stored data. Persistent storage devices, in contrast, provide relatively slower access to stored data, but are able to retain the stored data even when unpowered. Because conventional memory devices allow individual bytes of stored data to be directly accessed, they are referred to herein as "byte-addressable storage devices." Persistent storage devices that allow direct access only to larger units ("blocks") of data of a specified size (e.g., on the order of one (1) or more megabytes or larger) are referred to herein as "block-addressable storage devices."

To improve data access time using block-addressable storage devices, some conventional storage systems employ a tiering approach in which different types of block-addressable storage devices are classified into either a high-performance tier or a low-performance tier. The multiple tiers of block-addressable storage devices are presented to client devices as a single virtual block-addressable storage device. The storage systems monitor data access patterns and actively attempt to ensure that frequently accessed data is migrated into the high-performance tier and less frequently accessed data is migrated into the low-performance tier. Memory devices may be employed in such storage systems as caches for temporary storage of frequently accessed data, which may remain available only for a limited amount of time according to cache policies.

However, it is desirable to further improve data access performance in processor-based devices based on current input/output (I/O) workload, to optimize media endurance, and to track lifetime expectancy of storage devices to ensure maximum uptime.

SUMMARY

Exemplary embodiments disclosed herein include migrating data between byte-addressable and block-addressable storage devices in processor-based devices. In this regard, in one exemplary embodiment, a processor of a processor-based device is communicatively coupled to both a byte-addressable storage device (e.g., a memory device, as a non-limiting example) and a block-addressable storage device (e.g., a persistent storage device, as a non-limiting example). Both the byte-addressable storage device and the block-addressable storage device are used independently as direct access tiers behind a virtualization layer that presents both as a single virtual storage device (i.e., as either a byte-addressable virtual device or a block-addressable virtual storage device). The processor is configured to identify a low-activity region in the byte-addressable storage device, and to also identify a high-activity region in the block-addressable storage device. The processor then exchanges a first storage region corresponding to the low-activity region and comprising a memory address region of the byte-addressable storage device with a second storage region corresponding to the high-activity region and comprising a block region of the block-addressable storage device.

In some embodiments, exchanging the first storage region and the second storage region may comprise the processor copying the low-activity region to a first reserved section located on the block-addressable storage device using a byte-based read command to read from the byte-addressable storage device and a block-based write command to write to the block-addressable storage device. Some embodiments may provide that copying the low activity region may comprise converting from a byte format to a block format without losing data. The processor then updates a physical address of the low-activity region in a translation table. The processor next copies the high-activity region to a second reserved section located in the byte-addressable storage device using a block-based read command to read from the block-addressable storage device and a byte-based read command to write to the byte-addressable storage device. According to some embodiments, copying the high activity region may comprise converting from a block format to a byte format without losing data. The processor then updates a physical address of the high-activity region in the translation table.

According to some embodiments, the processor may generate usage statistics for the byte-addressable storage device and the block-addressable storage device, and identify the low-activity region and the high-activity region based on the usage statistics. In some such embodiments, identifying the high-activity region based on the usage statistics may comprise comparing the usage statistics for the block-addressable storage device with a value of a promotion threshold.

Some embodiments may provide that the processor receives a data access command to access a high-activity region in the block-addressable storage device. In embodiments in which the virtual storage device is presented as a byte-accessible virtual storage device, the data access command may comprise a byte-based storage command (i.e., a memory load command or a memory store command). Embodiments in which the virtual storage device is presented as a block-accessible virtual storage device may provide that the data access command comprises a block-based storage command. In such embodiments, the processor may be configured to identify the low-activity region and the high-activity region and exchange the first storage region with the second storage region responsive to receiving the data access command. According to some embodiments, the processor may be configured to identify the low-activity region and the high-activity region and exchange the first storage region with the second storage region at periodic time intervals (e.g., by executing a background process that wakes at regular time intervals).

In another exemplary embodiment, a processor-based device is provided. The processor-based device comprises a virtualization circuit that is communicatively coupled to a byte-addressable storage device and a block-addressable storage device. The virtualization circuit is configured to present, to a processor of the processor-based device, the byte-addressable storage device and the block-addressable storage device as a single virtual storage device. The virtualization circuit is further configured to identify a low-activity region in the byte-addressable storage device. The virtualization circuit is also configured to identify a high-activity region in the block-addressable storage device. The virtualization circuit is additionally configured to exchange a first storage region corresponding to the low-activity region and comprising a memory address region of the byte-addressable storage device with a second storage region corresponding to the high-activity region and comprising a block region of the block-addressable storage device.

In another exemplary embodiment, a method for migrating data between byte-addressable and block-addressable storage devices is provided. The method comprises presenting, by a processor of a processor-based device, a byte-addressable storage device and a block-addressable storage device as a single virtual storage device. The method further comprises identifying, by the processor, a low-activity region in the byte-addressable storage device. The method also comprises identifying, by the processor, a high-activity region in the block-addressable storage device. The method additionally comprises exchanging, by the processor, a first storage region corresponding to the low-activity region and comprising a memory address region of the byte-addressable storage device with a second storage region corresponding to the high-activity region and comprising a block region of the block-addressable storage device.

In another exemplary embodiment, a non-transitory computer-readable medium having stored thereon computer-executable instructions is provided. The computer-executable instructions, when executed by a processor, cause the processor to migrate data between byte-addressable and block-addressable storage devices by causing the processor to present a byte-addressable storage device and a block-addressable storage device as a single virtual storage device. The computer-executable instructions further cause the processor to identify a low-activity region in the byte-addressable storage device. The computer-executable instructions also cause the processor to identify a high-activity region in the block-addressable storage device. The computer-executable instructions additionally cause the processor to exchange a first storage region corresponding to the low-activity region and comprising a memory address region of the byte-addressable storage device with a second storage region corresponding to the high-activity region and comprising a block region of the block-addressable storage device.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 4:
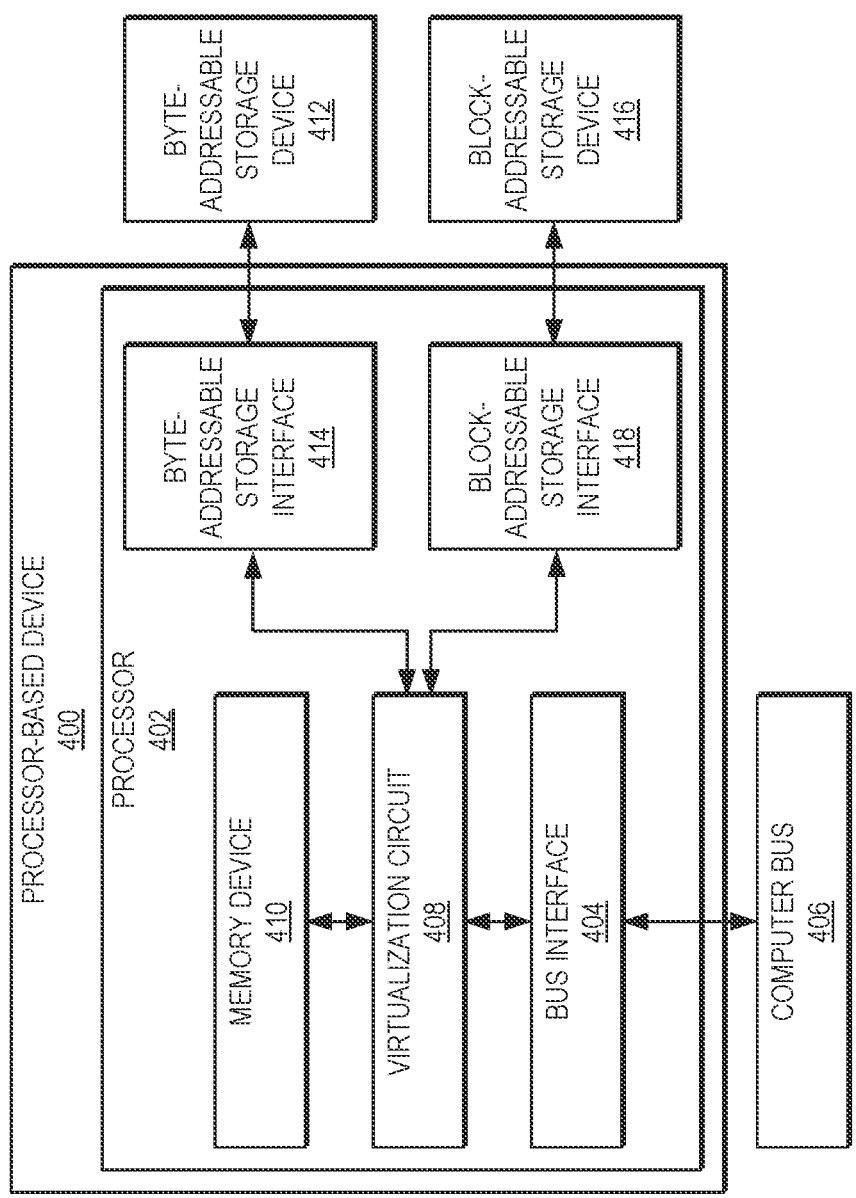
FIG. 4 is a block diagram illustrating an exemplary processor-based device including a virtualization circuit that is configured to migrate data between byte-addressable and block-addressable storage devices, according to some embodiments.
Figure 5:
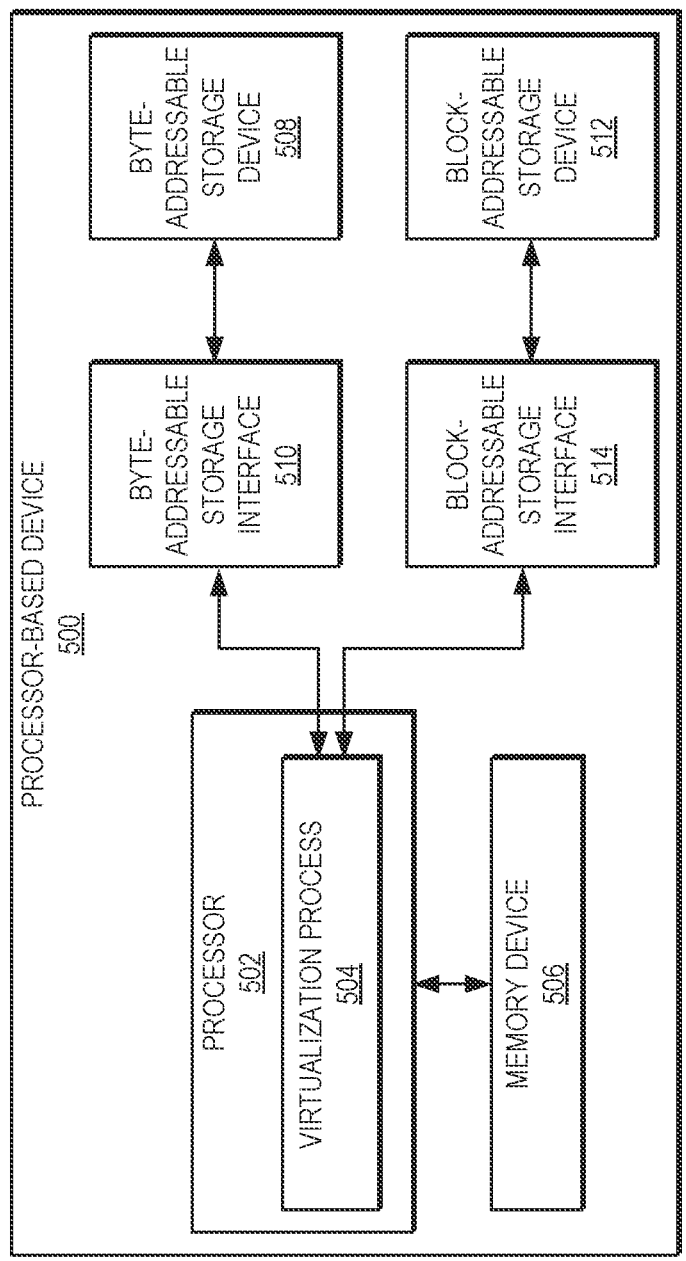
FIG. 5 is a block diagram illustrating an exemplary processor-based device configured to execute a virtualization process to migrate data between byte-addressable and block-addressable storage devices, according to some embodiments.
Figure 6A:
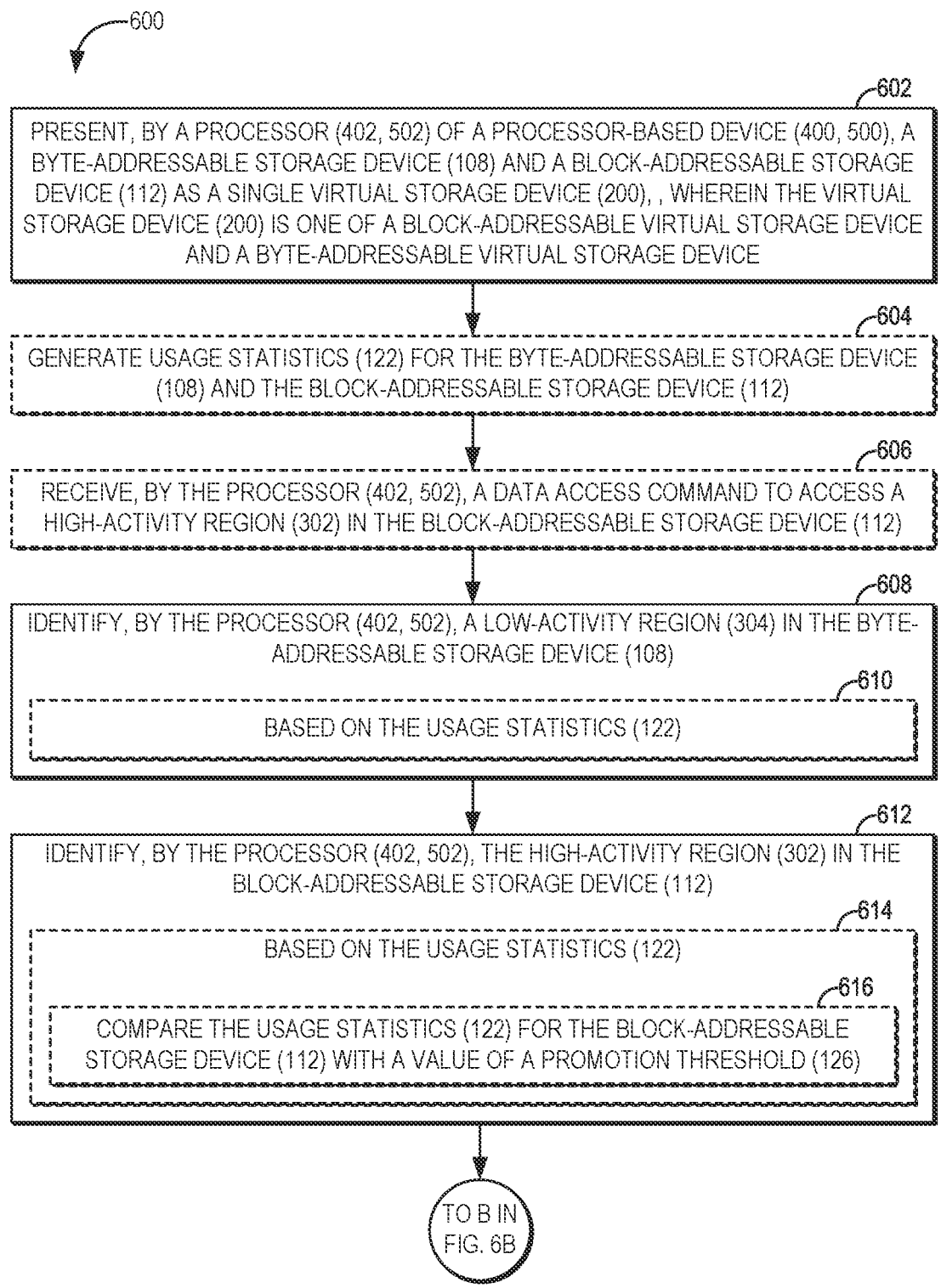
Figure 6B:
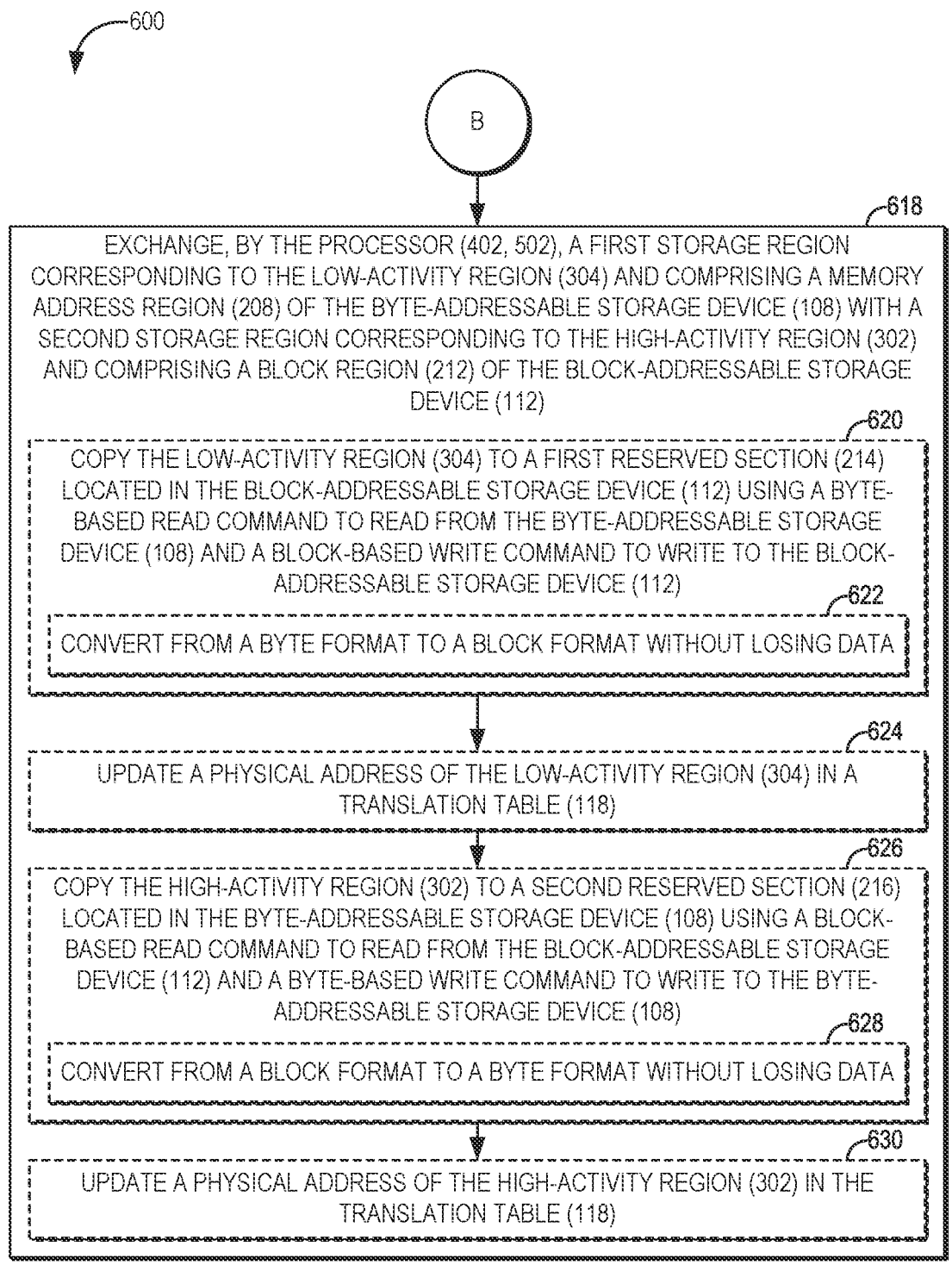
Figure 7:
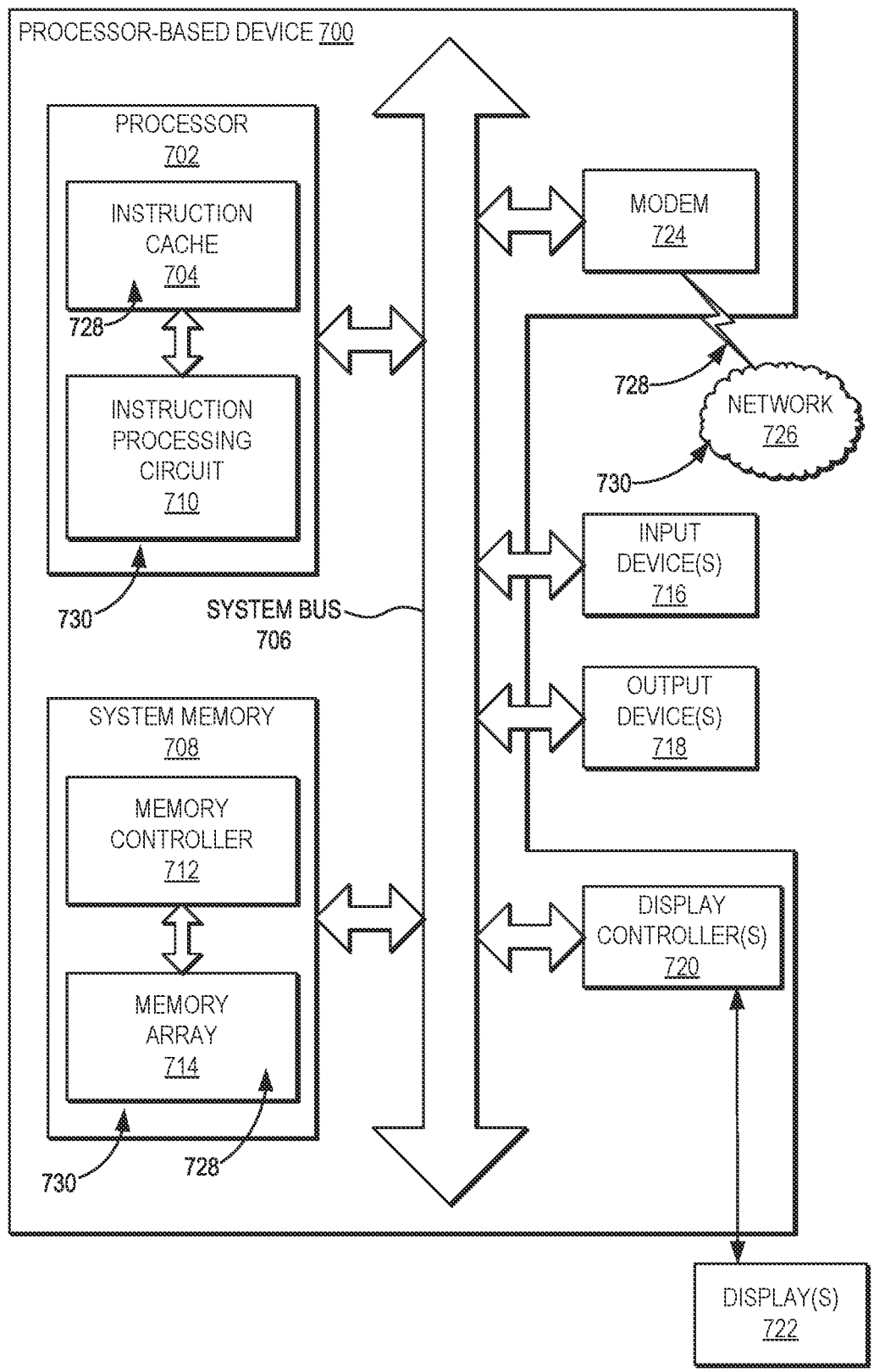

FIGS. 6A-6B provide a flowchart illustrating exemplary operations of the processor-based device of FIG. 4 or the processor-based device of FIG. 5 for migrating data between byte-addressable and block-addressable storage devices, according to some embodiments; and FIG. 7 is a block diagram of an exemplary processor-based device, such as the processor-based device of FIG. 4 or the processor-based device of FIG. 5, that is configured to migrate data between byte-addressable and block-addressable storage devices, according to some embodiments.

DETAILED DESCRIPTION

Exemplary embodiments disclosed herein include migrating data between byte-addressable and block-addressable storage devices in processor-based devices. In this regard, in one exemplary embodiment, a processor of a processor-based device is communicatively coupled to both a byte-addressable storage device (e.g., a memory device, as a non-limiting example) and a block-addressable storage device (e.g., a persistent storage device, as a non-limiting example). Both the byte-addressable storage device and the block-addressable storage device are used independently as direct access tiers behind a virtualization layer that presents both as a single virtual storage device (i.e., as either a byte-addressable virtual device or a block-addressable virtual storage device). The processor is configured to identify a low-activity region in the byte-addressable storage device, and to also identify a high-activity region in the block-addressable storage device. The processor then exchanges a first storage region corresponding to the low-activity region and comprising a memory address region of the byte-addressable storage device with a second storage region corresponding to the high-activity region and comprising a block region of the block-addressable storage device.

In some embodiments, exchanging the first storage region and the second storage region may comprise the processor copying the low-activity region to a first reserved section located the block-addressable storage device using a byte-based read command to read from the byte-addressable storage device and a block-based write command to write to the block-addressable storage device. Some embodiments may provide that copying the low activity region may comprise converting from a byte format to a block format without losing data. The processor then updates a physical address of the low-activity region in a translation table. The processor next copies the high-activity region to a second reserved section located in the byte-addressable storage device using a block-based read command to read from the block-addressable storage device and a byte-based read command to write to the byte-addressable storage device. According to some embodiments, copying the high activity region may comprise converting from a block format to a byte format without losing data. The processor then updates a physical address of the high-activity region in the translation table.

According to some embodiments, the processor may generate usage statistics for the byte-addressable storage device and the block-addressable storage device, and identify the low-activity region and the high-activity region based on the usage statistics. In some such embodiments, identifying the high-activity region based on the usage statistics may comprise comparing the usage statistics for the block-addressable storage device with a value of a promotion threshold.

Some embodiments may provide that the processor receives a data access command to access a high-activity region in the block-addressable storage device. In embodiments in which the virtual storage device is presented as a byte-accessible virtual storage device, the data access command may comprise a byte-based storage command (i.e., a memory load command or a memory store command). Embodiments in which the virtual storage device is presented as a block-accessible virtual storage device may provide that the data access command comprises a block-based storage command. In such embodiments, the processor may be configured to identify the low-activity region and the high-activity region and exchange the first storage region with the second storage region responsive to receiving the data access command. According to some embodiments, the processor may be configured to identify the low-activity region and the high-activity region and exchange the first storage region with the second storage region at periodic time intervals (e.g., by executing a background process that wakes at regular time intervals).

As used herein, the term "tier" refers to one or more storage devices that have a common performance characteristic. The term "performance characteristic" referred to herein is a measure of data handling capability that can include any device operation and interface timing. Examples of performance characteristics may include, as non-limiting examples, access time, data throughput, interface bandwidth, input/output operations per second (IOPS), and data priority. The term "storage device" used herein refers to an apparatus used for archiving and accessing data in a processor-based device environment. As non-limiting examples, a storage device may comprise a magnetic disk drive, a solid state drive (SSD), an optical disk drive, a magnetic tape drive, or the like, without regard to the interface attachment used. The term "virtual storage device" is used herein to refer to the total addressable storage available to a processor-based device that is composed of one or more storage devices, each of which represents a portion of the total addressable storage. The virtual storage device is addressed by a virtual address that is translated to a physical address within the one or more storage devices.

Figure 1:
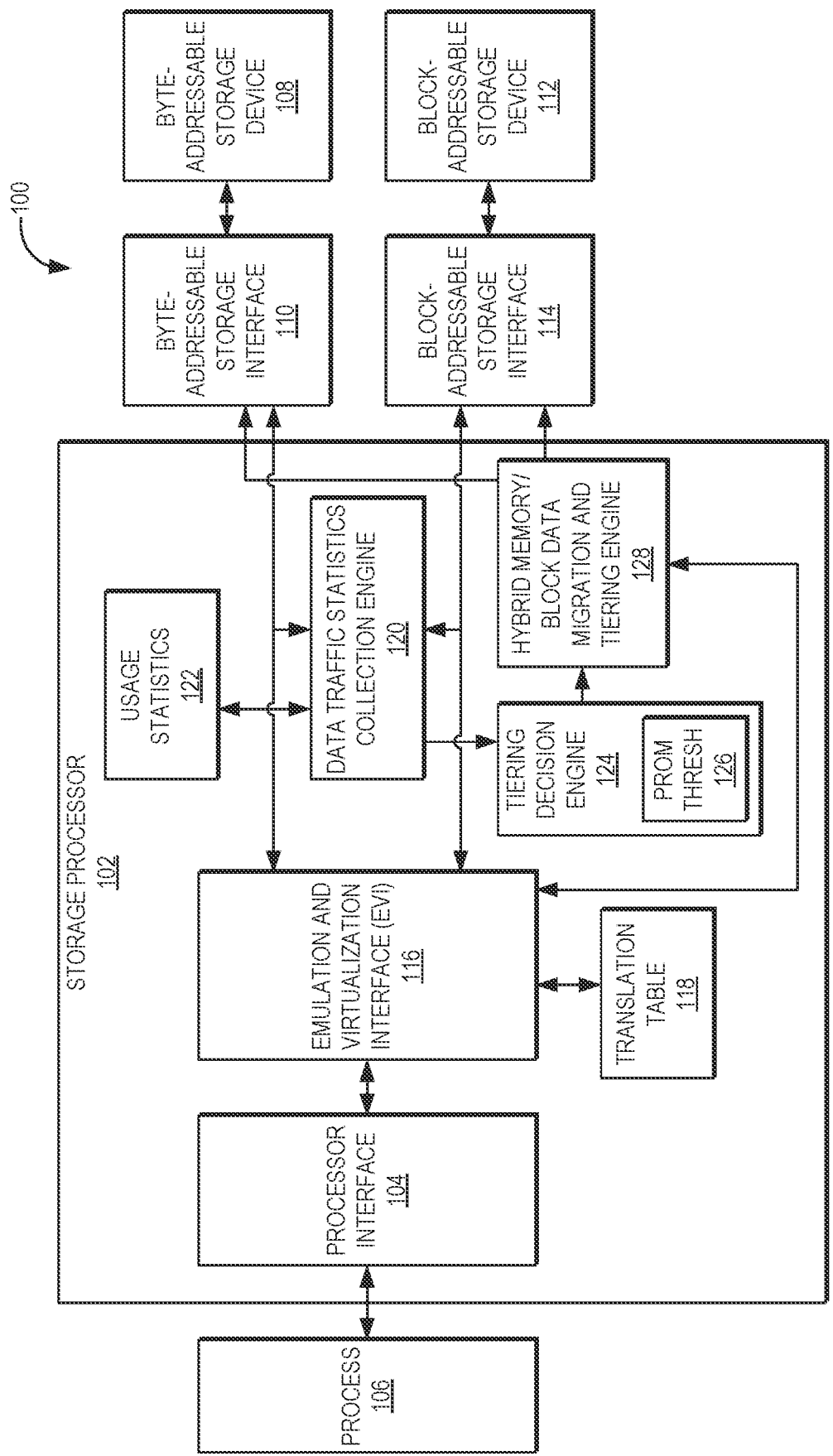
FIG. 1 is a block diagram illustrating functional elements of a storage system for migrating data between byte-addressable and block-addressable storage devices, according to some embodiments.

In this regard, FIG. 1 illustrates functional elements of a storage system 100 for migrating data between byte-addressable and block-addressable storage devices according to some embodiments. As seen in FIG. 1, the storage system 100 includes a storage processor 102 that comprises a processor interface 104 configured to implement a protocol for communicating with a process 106 executing on a processor of a processor-based device (not shown). The processor interface 104 may comprise, e.g., a parallel bus, a serial bus, an electronic connection, an optical connection, or a wireless connection, as non-limiting examples. The storage processor 102 is communicatively coupled to a byte-addressable storage device 108 via a byte-addressable storage interface 110, and is likewise communicatively coupled to a block-addressable storage device 112 via a block-addressable storage interface 114. The byte-addressable storage device 108 in some embodiments may comprise one or more memory devices, such as High Bandwidth Memory (HBM), Double Data Rate (DDR) Random-Access Memory (RAM) devices, Synchronous Dynamic RAM (SDRAM) memory devices, or Computer Express Link (CXL) external attached memory devices, as non-limiting examples. The block-addressable storage device 112 may comprise one or more NOT-AND (NAND) flash-based devices, standalone solid state disks (SSDs), CXL or fabric-attached external block-based storage devices, or very-high-performance serial-attached Small Computer System Interface (SCSI) (SAS) disk drives, as non-limiting examples.

The storage processor 102 is configured to perform storage virtualization functions, including storage device tiering, virtual-to-physical device mapping, and other data management functions. In particular, the storage processor 102 provides an emulation and virtualization interface (EVI) 116 that controls transfers of bytes of data and configuration information to and from the byte-addressable storage device 108 via the byte-addressable storage interface 110. The EVI 116 also controls transfers of blocks of data and configuration information to and from the block-addressable storage device 112 via the block-addressable storage interface 114. The EVI 116 is configured to present the byte-addressable storage device 108 and the block-addressable storage device 112 to the process 106 as a single virtual storage device (i.e., as either a byte-addressable virtual storage device or a block-addressable virtual storage device). The virtual storage device in some embodiments may be configured as either a byte-addressable virtual storage device or a block-addressable virtual during setup of the virtualization functions, or may be automatically setup at power-up or reset of the storage processor 102 based on user preferences or policies. The storage processor 102 in some embodiments may be further configured to reconfigure the virtual storage device as a byte-addressable virtual storage device or a block-addressable virtual storage device without losing any data already stored on the byte-addressable storage device 108 and the block-addressable storage device 112.

Data written to a virtual address of the virtual storage device by the process 106 is initially stored in one of the byte-addressable storage device 108 or the block-addressable storage device 112 by the EVI 116. As part of storing the data, the EVI 116 may convert from a block format to a byte format or vice versa by translating the virtual address into a physical address of a memory location of the byte-addressable storage device 108 or a physical address of a block region of the block-addressable storage device 112. This may involve, e.g., translating a virtual address of a byte-based write command into a physical address of a block region of block-addressable storage device 112, or translating a virtual address of a block-based write command into a physical address of a memory region of the byte-addressable storage device 108. For example, if the virtual storage device is presented as a byte-addressable virtual storage device, the EVI 116 may receive a byte-based write command from the process 106. If the EVI 116 determines that the data should be written to the block-addressable storage device 112, the EVI 116 may translate the virtual address specified by the byte-based write command into a physical address of a corresponding block region of the block-addressable storage device 112 by, e.g., utilizing read-modify-write (RMW) operations to modify the relevant byte portion of the block region. If the virtual storage device is presented as a block-addressable virtual storage device, the EVI 116 may receive a block-based write command from the process 106. If the EVI 116 determines that the data should be written to the byte-addressable storage device 108, the EVI 116 may translate the virtual address specified by the byte-based write command into a physical address of a corresponding memory region of the block-addressable storage device 112. The EVI 116 employs a translation table 118 to store virtual-to-physical address translations for later access.

The storage processor 102 further includes a data traffic statistics collection engine 120 that monitors data transmitted between the EVI 116 and the byte-addressable storage device 108 and the block-addressable storage device 112. The data traffic statistics collection engine 120 collects data relating to traffic access patterns, such as most frequently read bytes or blocks of data, counts of read and write operations, streaming or random access characteristics, and the like, as non-limiting examples. The data traffic statistics collection engine 120 then generates and stores usage statistics 122 based on the collected data. The usage statistics 122 may be implemented, e.g., as a table of counters in RAM (not shown). This usage statistics 122 may be subsequently used for a variety of purposes, including determining low-activity regions and high-activity regions in each of the tiers based on their access frequency, endurance information based on the frequency of writes, or other user programmable criteria such as size of access requests.

The storage processor 102 also provides a tiering decision engine 124 that uses usage statistics 122 to identify a low-activity region within the byte-addressable storage device 108 and a high-activity region within the block-addressable storage device 112. For example, the tiering decision engine 124 may compare the usage statistics 122 (e.g., access frequency, as a non-limiting example) for a block region within the block-addressable storage device 112 with a promotion threshold (captioned as "PROM THRESH" in FIG. 1) 126. The promotion threshold 126 may comprise, e.g., an access frequency threshold, a data access latency threshold, an endurance threshold, and/or an access request size threshold, as non-limiting examples. If the tiering decision engine 124 determines that the usage statistics 122 for the block region within the block-addressable storage device 112 exceeds the promotion threshold 126, the tiering decision engine 124 may identify the block region as the high-activity region. Some embodiments identify the low-activity region within the byte-addressable storage device 108 and the high-activity region within the block-addressable storage device 112 based on user policies and/or on physical media endurance and lifetime criteria, as non-limiting examples.

To optimize the performance of the storage system 100, the tiering decision engine 124 may determine that the low-activity region within the byte-addressable storage device 108 and the high-activity region within the block-addressable storage device 112 should be exchanged. The actual exchange of the data within the low-activity region for the data in the high-activity region is performed by a hybrid memory/block data migration and tiering engine 128 of the storage processor 102. Exemplary operations that may be performed to accomplish the exchange of data are discussed in greater detail below with respect to FIG. 3.

It is to be understood that, while the storage system 100 of FIG. 1 is shown with two tiers of storage (i.e., the byte-addressable storage device 108 and the block-addressable storage device 112), some embodiments may provide more tiers of storage. It is to be further understood that each tier of storage may comprise multiple storage devices.

Figure 2:
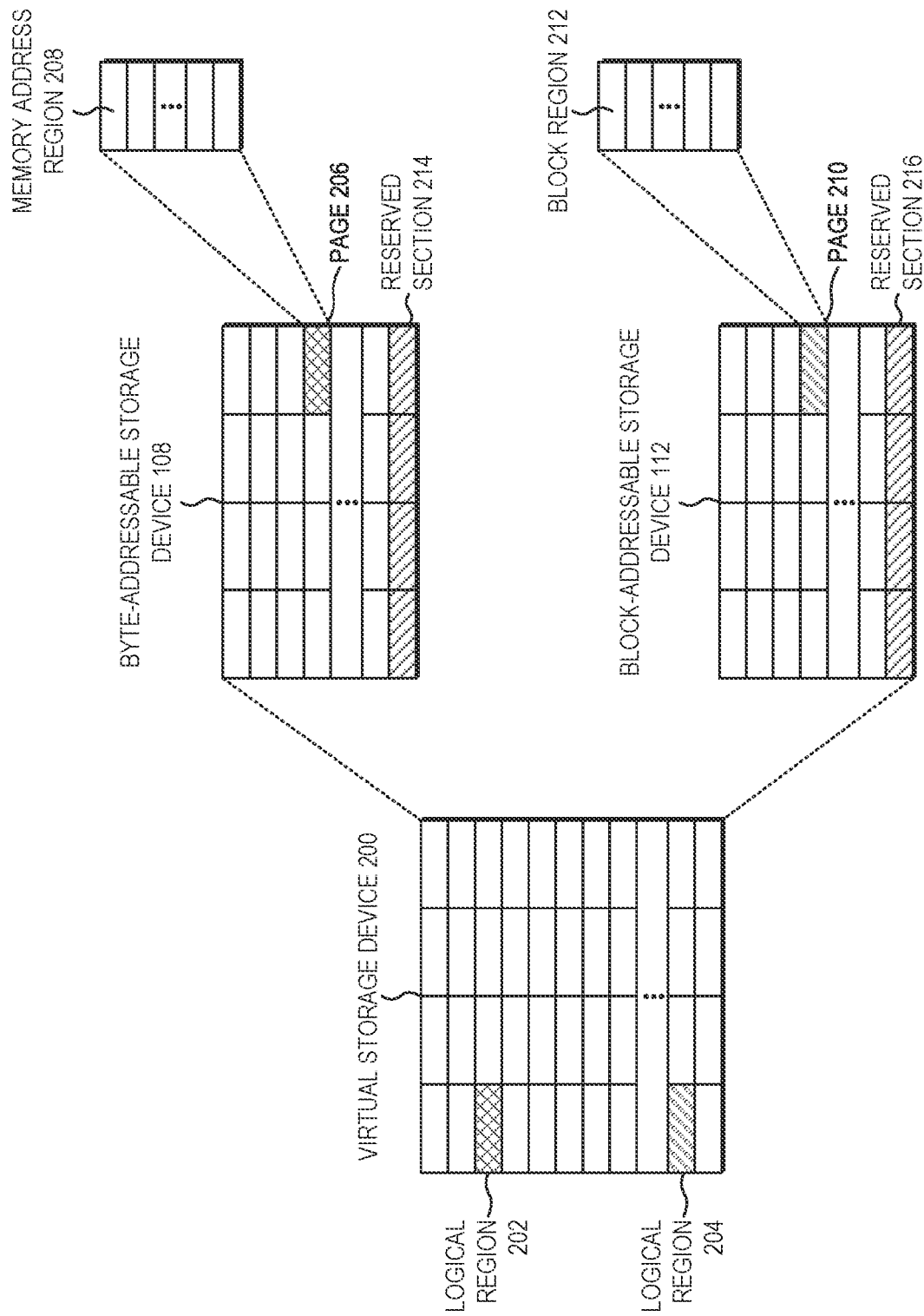
FIG. 2 is a block diagram illustrating exemplary virtual-to-physical address translations that may be performed by the storage system of FIG. 1, according to some embodiments.

FIG. 2 illustrates an exemplary virtual-to-physical address translation that may be performed by the storage system 100 of FIG. 1. Elements of FIG. 1 are referenced in describing FIG. 2 for the sake of clarity. In FIG. 2, the byte-addressable storage device 108 and the block-addressable storage device 112 of FIG. 1 are presented as a virtual storage device 200 (e.g., by the EVI 116 of FIG. 1). The virtual storage device 200 is subdivided into multiple logical regions of equal size, such as logical region 202 and logical region 204. Each of the logical regions of the virtual storage device 200 is mapped to a corresponding page of memory address regions of the byte-addressable storage device 108 or a corresponding page of block regions of the block-addressable storage device 112. In the example of FIG. 2, the logical region 202 of the virtual storage device 200 is mapped to a page 206 of memory address regions (such as memory address region 208) of the byte-addressable storage device 108, while the logical region 204 is mapped to a page 210 of block regions (e.g., block region 212) of the block-addressable storage device 112. The mappings may be stored in the translation table 118 of FIG. 1.

The byte-addressable storage device 108 and the block-addressable storage device 112 also include corresponding reserved sections 214 and 216, respectively. The reserved sections 214 and 216 are set aside for use by the hybrid memory/block data migration and tiering engine 128 of the storage processor 102 of FIG. 1 when exchanging data between a low-activity region within the byte-addressable storage device 108 and a high-activity region within the block-addressable storage device 112.

Figure 3:
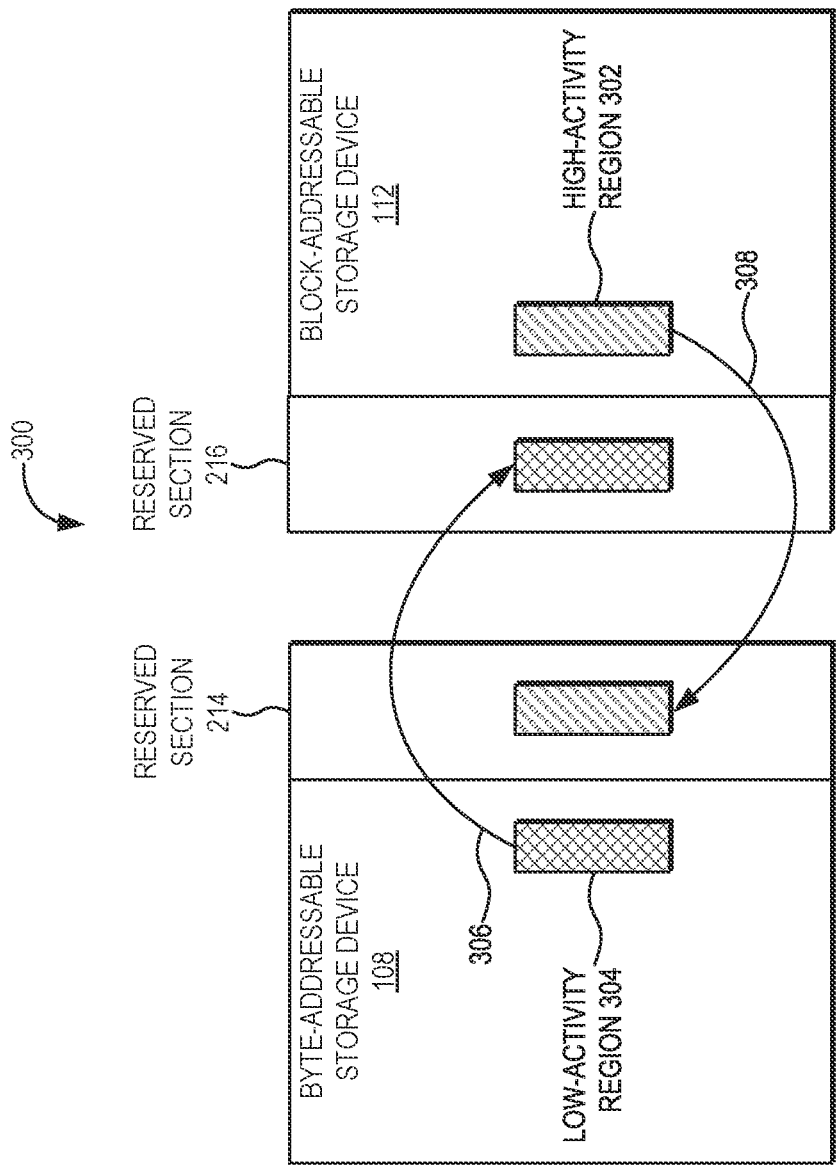
FIG. 3 is a block diagram illustrating an exchange of a high-activity region of the block-addressable storage device of FIGS. 1 and 2 with a low-activity region of the byte-addressable storage device of FIGS. 1 and 2, according to some embodiments.

In this regard, FIG. 3 illustrates an exchange 300 of a high-activity region 302 of the block-addressable storage device 112 of FIGS. 1 and 2 with a low-activity region 304 of the byte-addressable storage device 108 of FIGS. 1 and 2, according to some embodiments. In the example of FIG. 3, the exchange 300 is effectively a two-step transfer. First, the low-activity region 304 is copied into the reserved section 216 of the byte-addressable storage device 112, as indicated by arrow 306. Copying the low-activity region 304 may include, e.g., converting from a byte format to a block format without losing data. The physical address for the low-activity region 304 is then updated in the translation table 118 of FIG. 1 to reflect the new physical address for the low-activity region 304. Next, the high-activity region 302 of the block-addressable storage device 112 is copied into the reserved section 214 of the byte-addressable storage device 108 (e.g., by converting from a block format to a byte format without losing data), as indicated by arrow 308. The translation table 118 is then updated to reflect the new location of the high-activity region 302. This exchange frees up the previously used low activity region 304 and high activity region 302 to be designated and used as the reserved section 214 and 216, respectively, for a future data migration cycle. In some embodiments, the selection of the location of the reserved sections 214 and 216 within the byte-addressable storage device 108 and the block-addressable storage device 112, respectively, may be based on user policies and/or on information provided by underlying physical media controllers where available (e.g., NAND spare locations or bad block locations, as non-limiting examples).

According to some embodiments, additional reserved areas (not shown) on each tier may be provided for use during the transfer of data from one tier to another, and may include further operations to checkpoint the operations used during the transfer to enable recovery in the event of, e.g., power failure during the transfer. Some embodiments may provide that the exchange of the high-activity region 302 and the low-activity region 304 may be accomplished as a three-step transfer using a single reserved section by, e.g., copying the low-activity region 304 into the reserved section, copying the high-activity region 302 to the location in the byte-addressable storage device 108 that was occupied by the low-activity region 304, and then copying the copy of the low-activity region in the reserved section into the block-addressable storage device 112.

According to some embodiments, the functionality of the storage processor 102 of FIG. 1 may be implemented as hardware. In this regard, FIG. 4 illustrates an exemplary processor-based device 400 that provides a processor 402 for migrating data between byte-addressable and block-addressable storage devices. The processor-based device 400 in some embodiments may comprise, e.g., an adapter card that is communicatively coupled to an application central processing unit (CPU) or a Compute Express Link (CXL) switch via a bus interface 404 to a computer bus 406 (e.g., a CXL application computer bus). The processor 402 of FIG. 4 corresponds in functionality to the storage processor 102 of FIG. 1, and may comprise, e.g., an enhanced CXL controller. The processor 402 includes a virtualization circuit 408 that implements the functionality of the EVI 116, the data traffic statistics collection engine 120, the tiering decision engine 124, and the hybrid memory/block data migration and tiering engine 128 of FIG. 1. The processor 402 is communicatively coupled to a memory device 410 that provides addressable memory used for data storage by the processor-based device 400, and as such may comprise SDRAM or a non-volatile dual in-line memory module (NV-DIMM) device, as non-limiting examples. The memory device 410 may be used by the virtualization circuit 408 to store data such as the translation table 118 and/or the usage statistics 122 of FIG. 1. In some embodiments, the translation table 118 and/or the usage statistics 122 may be also stored in other persistent memory or storage devices, such as in persistent reserved areas on the each of the byte-addressable storage device 412 and/or the block-addressable storage device 416 if present, for retrieval after a power cycle reset. The processor 402 is also communicatively coupled to a byte-addressable storage device 412 via a byte-addressable storage interface 414, and likewise is communicatively coupled to a block-addressable storage device 416 via a block-addressable storage interface 418.

The processor-based device 400 of FIG. 4 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 400 may include more or fewer elements than illustrated in FIG. 4. For example, the processor 402 may further include one or more functional units, instruction caches, unified caches, memory controllers, interconnect buses, and/or additional memory devices, caches, and/or controller circuits, which are omitted from FIG. 4 for the sake of clarity.

Some embodiments may provide that the functionality of the storage processor 102 of FIG. 1 is implemented in software (e.g., as a low-level kernel driver or application). Accordingly, FIG. 5 illustrates a processor-based device 500 that comprises a processor 502 corresponding in functionality to the storage processor 102 of FIG. 1. The processor 502 executes a virtualization process 504 that implements the functionality of the EVI 116, the data traffic statistics collection engine 120, the tiering decision engine 124, and the hybrid memory/block data migration and tiering engine 128 of FIG. 1. The processor 502 of FIG. 5 is communicatively coupled to a memory device 506 (e.g., SDRAM or NV-DIMM, as non-limiting examples) that may be employed by the virtualization process 504 to store data such as the translation table 118 and/or the usage statistics 122 of FIG. 1. In some embodiments, the translation table 118 and/or the usage statistics 122 may be also stored in other persistent memory or storage devices, such as in persistent reserved areas on the each of the byte-addressable storage device 508 and/or the block-addressable storage device 512 if present, for retrieval after a power cycle reset. The processor 502 is also communicatively coupled to a byte-addressable storage device 508 via a byte-addressable storage interface 510, and is further communicatively coupled to a block-addressable storage device 512 via a block-addressable storage interface 514.

To illustrate exemplary operations of the processor-based device 400 of FIG. 4 or the processor-based device 500 of FIG. 5 for migrating data between byte-addressable and block-addressable storage devices according to some embodiments, FIGS. 6A-6B provides a flowchart illustrating exemplary operations 600. For the sake of clarity, elements of FIGS. 1-5 are referenced in describing FIGS. 6A-6B. It is to be understood that some of the exemplary operations 600 illustrated in FIGS. 6A-6B may be performed in an order other than that illustrated herein or may be omitted.

The exemplary operations 600 begin in FIG. 6A with a processor of a processor-based device (e.g., the processor 402 of the processor-based device 400 of FIG. 4 or the processor 502 of the processor-based device 500 of FIG. 5) presenting a byte-addressable storage device (such as the byte-addressable storage device 108 of FIGS. 1-3) and a block-addressable storage device (such as the block-addressable storage device 112 of FIGS. 1-3) as a single virtual storage device (such as the virtual storage device 200 of FIG. 2), wherein the virtual storage device (200) is one of a block-addressable virtual storage device and a byte-addressable virtual storage device (block 602). The virtual storage device 200 may be presented as a byte-addressable virtual device or may be presented as a block-addressable virtual device, based on configuration of the processor-based device 400, 500 according to user preference or system policy. According to some embodiments, the processor 402, 502 may generate usage statistics (e.g., the usage statistics 122 of FIG. 1) for the byte-addressable storage device 108 and the block-addressable storage device 112 (block 604).

Some embodiments may provide that the processor 402, 502 receives a data access command to access a high-activity region (e.g., the high-activity region 302 of FIG. 3) in the block-addressable storage device 112 (block 606). In embodiments in which the virtual storage device 200 is presented as a byte-accessible virtual storage device, the data access command may comprise a byte-based storage command (i.e., a memory load command or a memory store command). Embodiments in which the virtual storage device 200 is presented as a block-accessible virtual storage device may provide that the data access command comprises a block-based storage command.

The processor 402, 502 identifies a low-activity region (e.g., the low-activity region 304 of FIG. 3) in the byte-addressable storage device 108 (block 608). Some embodiments may provide that the operations of block 608 for identifying the low-activity region 304 are based on the usage statistics 122 (block 610). The processor 402, 502 also identifies the high-activity region 302 in the block-addressable storage device 112 (block 612). According to some embodiments, the operations of block 612 for identifying the high-activity region 302 may be based on the usage statistics 122 (block 614). In some embodiments, the operations of block 614 for identifying the high-activity region 302 based on the usage statistics 122 may comprise comparing the usage statistics 122 for the block-addressable storage device 112 with a value of a promotion threshold (such as the promotion threshold 126 of FIG. 1) (block 616). The exemplary operations 600 then continue at block 618 of FIG. 6B. The exemplary operations 600 shown in FIG. 6B may be performed immediately subsequent to the operations of block 616, or may be performed later by a background function or process.

Turning now to FIG. 6B, the processor 402, 502 exchanges a first storage region corresponding to the low-activity region 304 and comprising a memory address region (e.g., the memory address region 208 of FIG. 2) of the byte-addressable storage device 108 with a second storage region corresponding to the high-activity region 302 and comprising a block region (such as the block region 212 of FIG. 2) of the block-addressable storage device 112 (block 618). Some embodiments may provide that the operations of block 618 for exchanging the first storage region and the second storage region may comprise the processor 402, 502 copying the low-activity region 304 to a reserved section (e.g., the reserved section 214 of FIG. 3) located in the block-addressable storage device 112 using a byte-based read command to read from the byte-addressable storage device 108 and a block-based write command to write to the block-addressable storage device 112 (block 620). In some embodiments, the operations of block 620 for copying the low-activity region 304 may comprise converting from a byte format to a block format without losing data (block 622). The processor 402, 502 then updates a physical address of the low-activity region 304 in a translation table (e.g., the translation table 118 of FIG. 1) (block 624).

Next, the processor 402, 502 copies the high-activity region 302 to a second reserved section (e.g., the reserved section 216 of FIG. 3) located in the byte-addressable storage device 108 using a block-based read command to read from the block-addressable storage device 112 and a byte-based write command to write to the byte-addressable storage device 108 (block 626). Some embodiments may provide that the operations of block 626 for copying the high-activity region 302 comprise converting from a block format to a byte format without losing data (block 628). The processor 402, 502 then updates a physical address of the high-activity region 302 in the translation table 118 (block 630).

It is to be understood that, in some embodiments, the operations of block 608 of FIG. 6A for identifying the low-activity region 304, the operations of block 612 of FIG. 6A for identifying the high-activity region 302, and the operations of block 618 of FIG. 6B for exchanging the first storage region and the second storage region may be performed responsive to the processor 402, 502 receiving the data access command at block 606 of FIG. 6A. Some embodiments may provide that the operations of block 608 of FIG. 6A for identifying the low-activity region 304, the operations of block 612 of FIG. 6A for identifying the high-activity region 302, and the operations of block 618 of FIG. 6B for exchanging the first storage region and the second storage region may be performed at periodic time intervals by the processor 402, 502. For instance, the processor 402, 502 may execute a background process that wakes at regular time intervals and performs the operations of blocks 608 and 612 of FIG. 6A and block 618 of FIG. 6B. Some embodiments may provide that the low-activity region 304 and the high activity region 302 are identified by a host application processor (not shown) and provided to the processor 402, 502 for execution without the use of the built-in statistics capabilities of the processor 402, 502.

FIG. 7 is a block diagram of an exemplary processor-based device 700, such as the processor-based device 400 of FIG. 4 or the processor-based device 500 of FIG. 5, that migrates data between byte-addressable and block-addressable storage devices. The processor-based device 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 700 includes a processor 702. The processor 702 comprises one or more general-purpose processing circuits, such as a microprocessor, central processing unit, or the like, and may correspond to the processor 402 of FIG. 4 or the processor 502 of FIG. 5.

The processor 702 is configured to execute instructions for performing the operations and steps discussed herein. In this example, the processor 702 includes an instruction cache 704 for temporary, fast access memory storage of instructions, and further includes an instruction processing circuit 710. The instruction cache 704 stores instructions that are fetched from a memory, such as from a system memory 708 over a system bus 706. The instruction processing circuit 710 is configured to retrieve the instructions fetched into the instruction cache 704, and process the instructions for execution.

The processor 702 and the system memory 708 are coupled to the system bus 706, and can intercouple peripheral devices included in the processor-based device 700. The processor 702 communicates with these other devices by exchanging address, control, and data information over the system bus 706. For example, the processor 702 can communicate bus transaction requests to a memory controller 712 in the system memory 708 as a non-limiting example of a peripheral device. Although not illustrated in FIG. 7, multiple system buses 706 may be provided, wherein each system bus constitutes a different fabric. In the example of FIG. 7, the memory controller 712 is configured to provide memory access requests to a memory array 714 in the system memory 708. The memory array 714 is comprised of an array of storage bit cells for storing data. The system memory 708 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices may be connected to the system bus 706 in some embodiments. As illustrated in FIG. 7, these devices may include the system memory 708, one or more input device(s) 716, one or more output device(s) 718, a modem 724, and one or more display controller(s) 720, as examples. The input device(s) 716 may include any type of input device, including but not limited to input keys, switches, voice processors, etc. The output device(s) 718 may include any type of output device, including but not limited to audio, video, other visual indicators, etc. The modem 724 may be any device configured to allow exchange of data to and from a network 726. The network 726 may be any type of network, including but not limited to a wired or wireless network, a private or public network, a local area network (LAN), a wireless local area network (WLAN), a wide area network (WAN), a BLUETOOTH™ network, and the Internet. The modem 724 may be configured to support any type of communications protocol desired. The processor 702 may also be configured to access the display controller(s) 720 over the system bus 706 to control information sent to one or more display(s) 722. The display(s) 722 may include any type of display, including, but not limited to, a cathode ray tube (CRT), a liquid crystal display (LCD), a plasma display, etc.

The processor-based device 700 in FIG. 7 may include a set of computer-executable instructions 728 that may be executed by the processor 702 for any application desired according to the instructions. The computer-executable instructions 728 may be stored in the system memory 708, processor 702, and/or instruction cache 704 as examples of non-transitory computer-readable medium 730. The computer-executable instructions 728 may also reside, completely or at least partially, within the system memory 708 and/or within the processor 702 during their execution. The computer-executable instructions 728 may further be transmitted or received over the network 726 via the modem 724, such that the network 726 includes the computer-readable medium 730.

While the computer-readable medium 730 is shown in an exemplary embodiment to be a single medium, the term "computer-readable medium" as used herein may refer to a single medium or multiple media (e.g., a centralized or distributed database, and/or associated caches and servers) that store the one or more sets of computer-executable instructions 728. The term "computer-readable medium" shall also be taken to include any medium that is capable of storing, encoding, or carrying a set of computer-executable instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in computer-executable instructions, which may be used to cause a general-purpose or special-purpose processor programmed with the computer-executable instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising a virtualization circuit communicatively coupled to a byte-addressable storage device and a block-addressable storage device;
    the virtualization circuit configured to:
        present, to a processor of the processor-based device, the byte-addressable storage device and the block-addressable storage device as a single virtual storage device;
        generate a usage statistic for each of the byte-addressable storage device and the block-addressable storage device;
        identify a low-activity region in the byte-addressable storage device based on the usage statistic for the byte-addressable storage device;
        identify a high-activity region in the block-addressable storage device based on the usage statistic for the block-addressable storage device; and
        exchange a first storage region corresponding to the low-activity region and comprising a memory address region of the byte-addressable storage device with a second storage region corresponding to the high-activity region and comprising a block region of the block-addressable storage device;
    wherein:
        the single virtual storage device is configurably presented as one of a byte-addressable virtual storage device and a block-addressable virtual storage device;
        the high-activity region comprises a block-addressable storage region for which the corresponding usage statistic exceeds a value of a promotion threshold; and
        the low-activity region comprises a byte-addressable storage region for which the corresponding usage statistic is lower than the usage statistic for the high-activity region.

2. The processor-based device of claim 1, wherein:
    the virtualization circuit comprises a translation table; and
    the virtualization circuit is configured to exchange the first storage region with the second storage region by being configured to:
        copy the low-activity region to a first reserved section located in the block-addressable storage device using a byte-based read command to read from the byte-addressable storage device and a block-based write command to write to the block-addressable storage device;
        update a physical address of the low-activity region in the translation table;
        copy the high-activity region to a second reserved section located in the byte-addressable storage device using a block-based read command to read from the block-addressable storage device and a byte-based write command to write to the byte-addressable storage device; and
        update a physical address of the high-activity region in the translation table.

3. The processor-based device of claim 2, wherein:
    the virtualization circuit is configured to copy the low-activity region by being configured to convert from a byte format to a block format without losing data; and
    the virtualization circuit is configured to copy the high-activity region by being configured to convert from a block format to a byte format without losing data.

4. The processor-based device of claim 1, wherein:
    the virtualization circuit is further configured to receive, from the processor, a data access command to access the high-activity region; and
    the virtualization circuit is configured to identify the low-activity region, identify the high-activity region, and exchange the first storage region with the second storage region responsive to receiving the data access command.

5. The processor-based device of claim 4, wherein:
    the virtual storage device comprises a byte-addressable virtual device; and
    the data access command comprises a byte-based storage command.

6. The processor-based device of claim 4, wherein:
    the virtual storage device comprises a block-addressable virtual device; and
    the data access command comprises a block-based storage command.

7. The processor-based device of claim 1, wherein the virtualization circuit is configured to identify the low-activity region, identify the high-activity region, and exchange the first storage region with the second storage region at periodic time intervals.

8. The processor-based device of claim 1, wherein the promotion threshold comprises one or more of an access frequency threshold, a data access latency threshold, an endurance threshold, and an access request size threshold.

9. A method, comprising:
presenting, by a processor of a processor-based device, a byte-addressable storage device and a block-addressable storage device as a single virtual storage device;
generating a usage statistic for each of the byte-addressable storage device and the block-addressable storage device;
identifying, by the processor, a low-activity region in the byte-addressable storage device based on the usage statistic for the byte-addressable storage device;
identifying, by the processor, a high-activity region in the block-addressable storage device based on the usage statistic for the block-addressable storage device; and
exchanging, by the processor, a first storage region corresponding to the low-activity region and comprising a memory address region of the byte-addressable storage device with a second storage region corresponding to the high-activity region and comprising a block region of the block-addressable storage device;
wherein:
the single virtual storage device is configurably presented as one of a byte-addressable virtual storage device and a block-addressable virtual storage device;
the high-activity region comprises a block-addressable storage region for which the corresponding usage statistic exceeds a value of a promotion threshold; and
the low-activity region comprises a byte-addressable storage region for which the corresponding usage statistic is lower than the usage statistic for the high-activity region.

10. The method of claim 9, wherein exchanging the first storage region with the second storage region comprises:
copying the low-activity region to a first reserved section located in the block-addressable storage device using a byte-based read command to read from the byte-addressable storage device and a block-based write command to write to the block-addressable storage device;
updating a physical address of the low-activity region in a translation table;
copying the high-activity region to a second reserved section located in the byte-addressable storage device using a block-based read command to read from the block-addressable storage device and a byte-based write command to write to the byte-addressable storage device; and
updating a physical address of the high-activity region in the translation table.

11. The method of claim 10, wherein:
copying the low-activity region comprises converting from a byte format to a block format without losing data; and
copying the high-activity region comprises converting from a block format to a byte format without losing data.

12. The method of claim 9, further comprising receiving, by the processor, a data access command to access the high-activity region;
wherein the method comprises identifying the low-activity region, identifying the high-activity region, and exchanging the first storage region with the second storage region responsive to receiving the data access command.

13. The method of claim 12, wherein:
the virtual storage device comprises a byte-addressable virtual device; and
the data access command comprises a byte-based storage command.

14. The method of claim 12, wherein:
the virtual storage device comprises a block-addressable virtual device; and
the data access command comprises a block-based storage command.

15. The method of claim 9, comprising identifying the low-activity region, identifying the high-activity region, and exchanging the first storage region with the second storage region at periodic time intervals.

16. The method of claim 9, wherein the promotion threshold comprises one or more of an access frequency threshold, a data access latency threshold, an endurance threshold, and an access request size threshold.

17. A non-transitory computer-readable medium, having stored thereon computer-executable instructions that, when executed, cause a processor of a processor-based device to:
present a byte-addressable storage device and a block-addressable storage device as a single virtual storage device;
generate a usage statistic for each of the byte-addressable storage device and the block-addressable storage device;
identify a low-activity region in the byte-addressable storage device based on the usage statistic for the byte-addressable storage device;
identify a high-activity region in the block-addressable storage device based on the usage statistic for the block-addressable storage device; and
exchange a first storage region corresponding to the low-activity region and comprising a memory address region of the byte-addressable storage device with a second storage region corresponding to the high-activity region and comprising a block region of the block-addressable storage device;
wherein:
the single virtual storage device is configurably presented as one of a byte-addressable virtual storage device and a block-addressable virtual storage device;
the high-activity region comprises a block-addressable storage region for which the corresponding usage statistic exceeds a value of a promotion threshold; and
the low-activity region comprises a byte-addressable storage region for which the corresponding usage statistic is lower than the usage statistic for the high-activity region.

18. The non-transitory computer-readable medium of claim 17, wherein the computer-executable instructions cause the processor to exchange the first storage region with the second storage region by causing the processor to:
copy the low-activity region to a first reserved section located in the block-addressable storage device using a byte-based read command to read from the byte-addressable storage device and a block-based write command to write to the block-addressable storage device;

update a physical address of the low-activity region in a translation table;
copy the high-activity region to a second reserved section located in the byte-addressable storage device using a block-based read command to read from the block-addressable storage device and a byte-based write command to write to the byte-addressable storage device; and
update a physical address of the high-activity region in the translation table.

* * * * *